Oct. 29, 1968   C. HILL ETAL   3,407,893
MOTOR VEHICLES HAVING FOUR WHEEL DRIVE
Filed Jan. 19, 1966   6 Sheets-Sheet 4
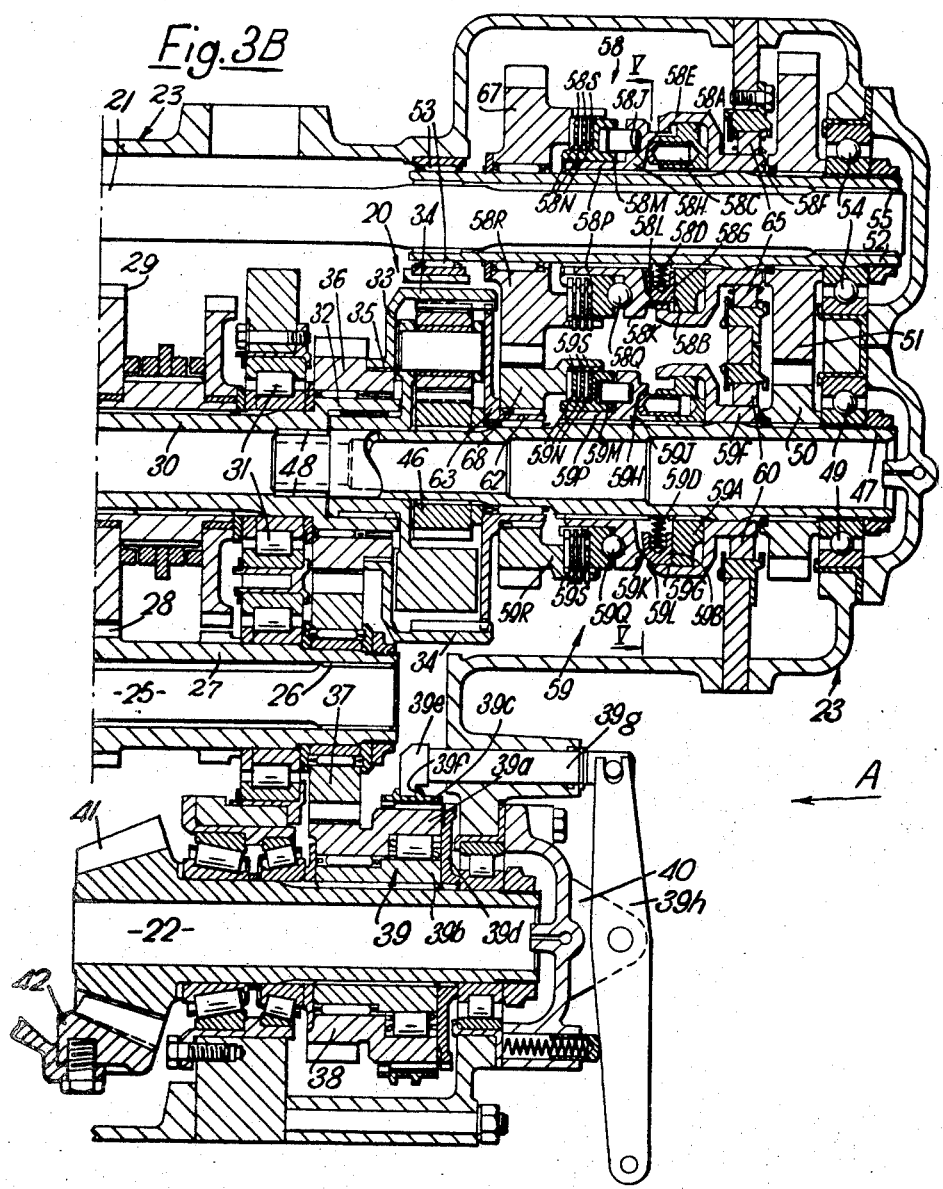

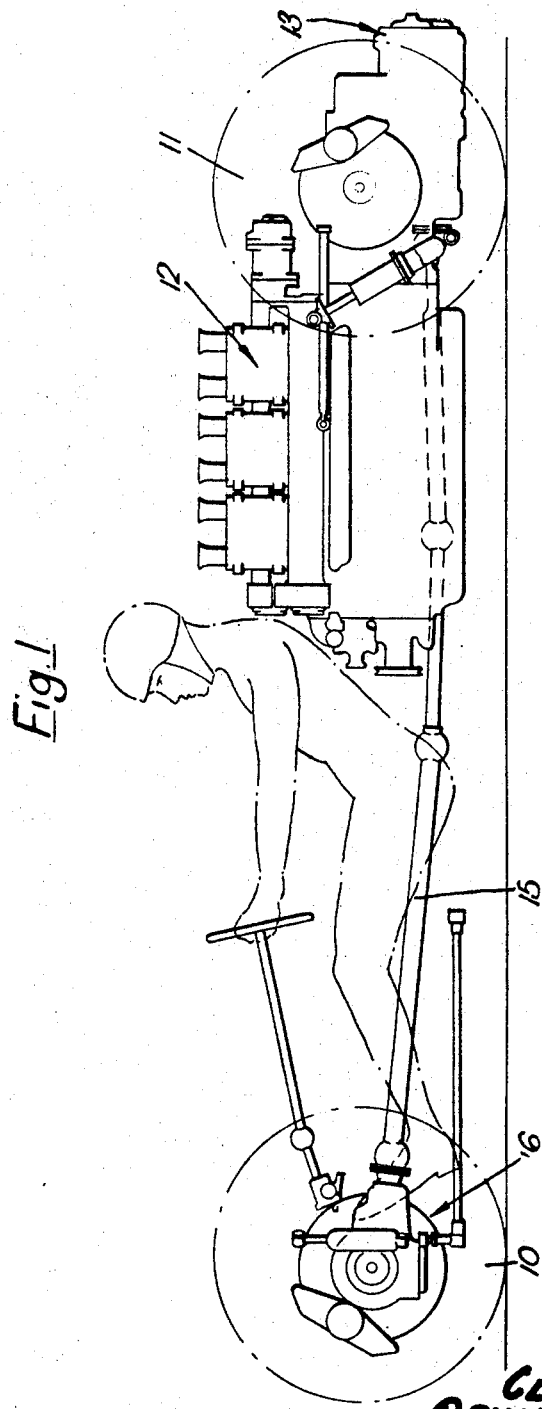

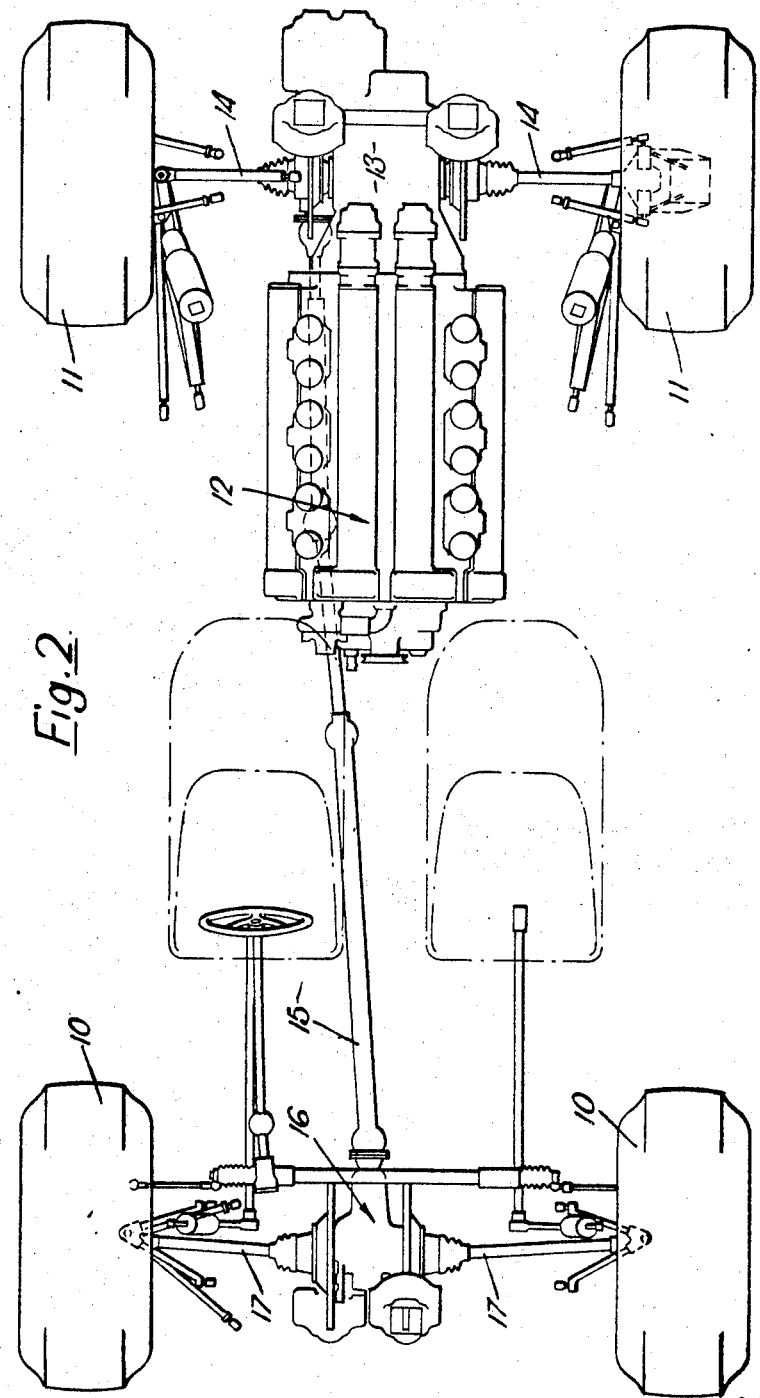

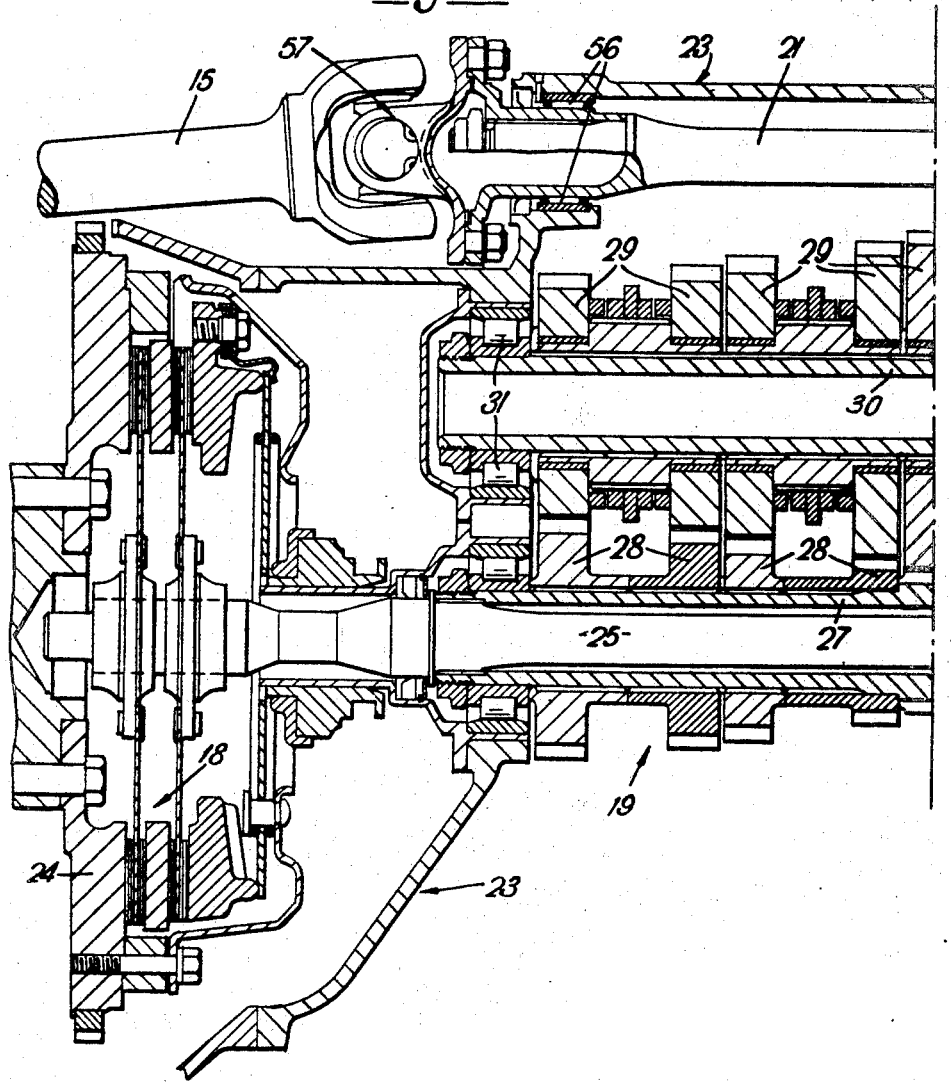

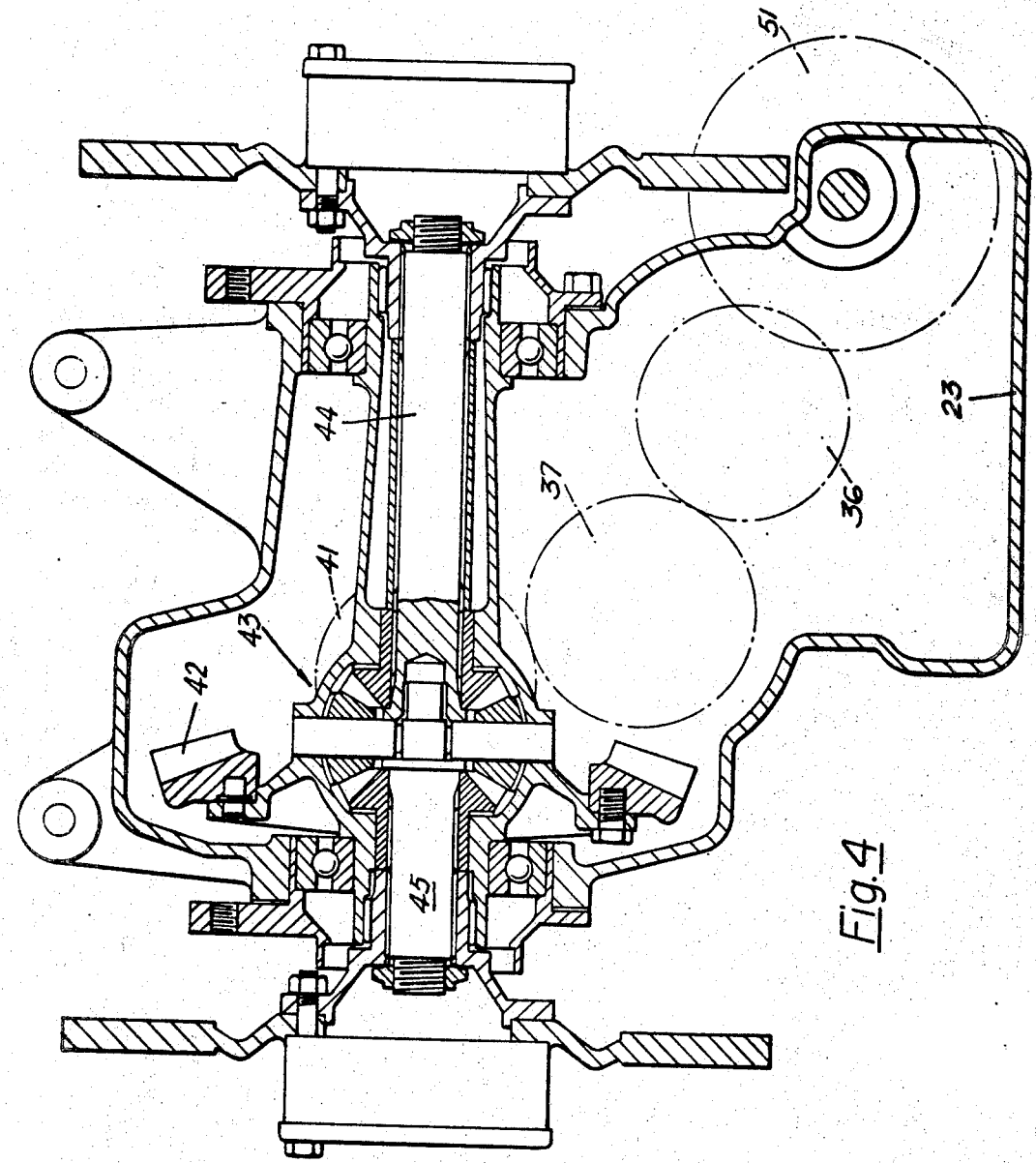

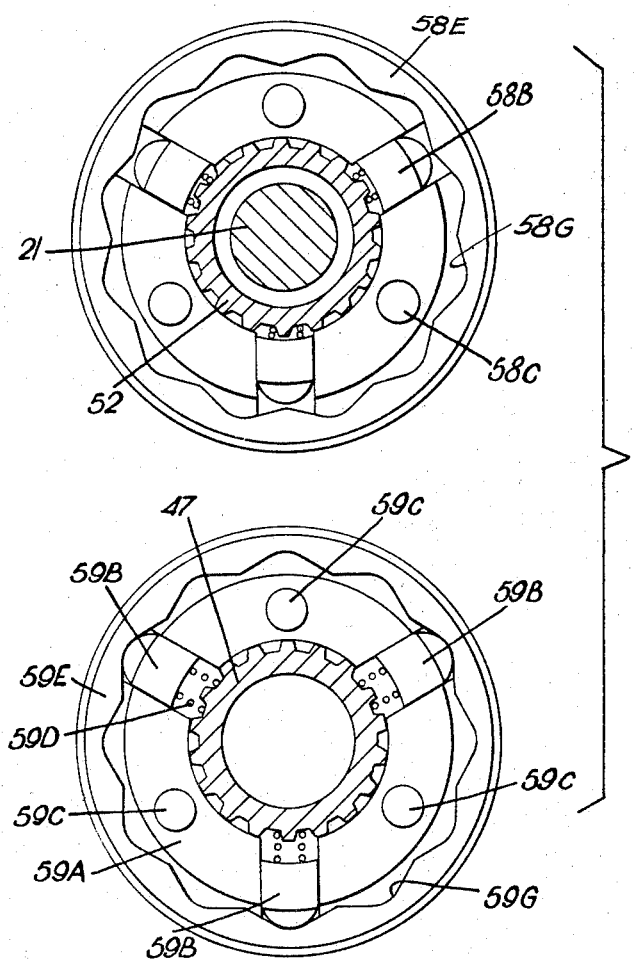

United States Patent Office 3,407,893
Patented Oct. 29, 1968

3,407,893
MOTOR VEHICLES HAVING FOUR-
WHEEL DRIVE
Claude Hill, Kenilworth, Warwickshire, and Oswald
Webb, Coventry, Warwickshire, England, assignors
to Harry Ferguson Research Limited
Filed Jan. 19, 1966, Ser. No. 521,733
Claims priority, application Great Britain, Dec. 29, 1965,
55,023/65
13 Claims. (Cl. 180—44)

ABSTRACT OF THE DISCLOSURE

In a four-wheel drive motor vehicle, drive is transmitted to front and rear inter-wheel differential gears from a rear mounted engine by way of a compact transmission unit which includes change-speed gears, a centre differential gear, a drive transfer and the rear interwheel differential gear. The centre differential gear is a three-element planetary spur-type gear whereof the planet carrier is driven by the change-speed gear, the annulus drives the rear differential gear, and the sun gear drives the front differential gear through the drive transfer and a shaft offset from the axis of the centre differential gear. The axle ratios and the drive transfer ratio are selected to induce a predetermined "working" of the centre differential gear during normal forward drive and a first one-way overruning control clutch coaxial with the centre differential locks the sun gear to the annulus when the front wheels tend to lock and/or the rear wheels tend to spin, that is when the "working" of the center differential gear changes in one sense, and a second one-way overrunning control clutch coaxial with the offset shaft locks the sun gear to the annulus when the front wheels tend to spin and/or the rear wheels tend to lock, that is when the "working" of the center differential gear changse in the opposite sense, opposite members of the control clutches being interconnected through the said drive transfer, and an additional drive transfer.

The invention relates to four-wheel drive motor vehicle transmission systems.

The term "four-wheel drive motor vehicle" used herein is intended to include motor vehicles having any number of road wheels above four, at least two pairs of which are engine driven.

In general, in previously proposed four-wheel drive motor vehicles, a power shaft extends from the engine to a main differential gear located generally centrally of the vehicle, and front and rear propeller shafts extend respectively forwards and rearwards from the main differential gear to front and rear interwheel differential gears of the vehicle.

According to the present invention there is provided a four-wheel drive motor vehicle transmission system having front and rear pairs of road wheels, first and second drive shafts and front and rear differential gears drivingly connecting the drive shafts respectively to the pairs of wheels, a prime mover, and transmission means providing a driving connection between the prime mover and the first and second drive shafts with freedom for differential action one relative to the other, said transmission means including a three-element planetary center differential gear of which the three elements are an input element and two output elements, a driving connection between the input element of the center differential gear and the prime mover, a first transmission shaft offset with respect to the axis of rotation of the said input element, a second transmission shaft disposed coaxially with the input element and drivingly connected to one of the output elements of the center differential gear, first drive transfer means providing a drive between the second transmission shaft and the first transmission shaft and including first and second drive wheels drivingly connected to and coaxial with the second and first transmission shafts respectively, the other of said output elements being in driving connection with one of the drive shafts, said first transmission shaft being in driving connection with the other drive shaft, the ratios of the front and rear differential gears and the ratio of the first and second drive wheels being such that during normal forward drive, when the road wheels are rotating without slip, there is rotational overrun of one output element relative to the other output element, a first overrunning clutch device for locking the center differential gear when the direction of said rotational overrun tends to reverse, said first clutch device having a first underrunning member and a first overrunning member which members are disposed coaxially with the second transmission shaft and are drivingly connected one to said one output element and the other to one of the other elements of the center differential gear, second drive transfer means including third and fourth drive wheels coaxial with the second and first transmission shafts respectively, the third drive wheel being drivingly connected to said one of the other elements of the center differential gear, and a second overrunning clutch device for locking the center differential gear when the magnitude of said rotational overrun tends to exceed a predetermined value, said second clutch device having a second underrunning member and a second overrunning member which members are disposed coaxially with the first transmission shaft and are drivingly connected one to the first transmission and the other to the fourth drive wheel, said predetermined value being determined by the ratio of the third and fourth drive wheels, the first underrunning member being in driving connection with the second overrunning member through one of the drive transfer means, the first overruning member being in driving connection with the second underrunning member through the other drive transfer means.

An embodiment of the invention will now be described, by way of example only, with reference to the accompanying drawings in which:

FIG. 1 is a side elevation showing part of a racing vehicle having a transmission system in accordance with the present invention, FIG. 2 is a plan view of FIG. 1, FIGS. 3A and 3B together form a partly diagrammatic sectional plan view of a part of the transmission system of FIGS. 1 and 2 to a larger scale, the plan view having been developed to show the principal axes in one plane, FIG. 4 is a sectional end elevation of a further part of the transmission system taken in the direction of arrow "A" in FIG. 3B.

FIG. 5 is a sectional diagrammatic view taken on the line V—V in FIG. 3B and to a larger scale than FIG. 3B.

In FIGURES 1 and 2 of the drawings, there is shown a motor vehicle transmission system having a front pair of road wheels 10, a rear pair of road wheels 11, an engine 12 situated towards the rear of the vehicle and connected by a transmission unit 13 to rear half shafts 14 connected to the rear wheels 11, and to a first drive shaft in the form of a propeller shaft 15 connected through a front inter-wheel differential gear 16 and front half shafts 17 to the front wheels 10.

Referring to FIGS. 3A and 3B, the transmission unit incorporates a main clutch 18, a change speed gear assembly 19, a centre differential gear 20, and outputs to the front and rear wheels taken through the propeller shaft 15 and a second drive shaft in the form of a stub shaft 22 respectively. The entire assembly is housed in a casing 23, and the main differential gear 20 is an epicyclic gear.

The engine crank shaft (not shown) carries a flywheel 24 connected through the foresaid main clutch 18 to an input shaft 25 extending longitudinally of the vehicle and rearwardly from the engine. The rear end of the input shaft 25 is connected by splines 26 to a main shaft 27 which sleeves the input shaft 25 and carries a gear cluster 28 meshing with a change-speed gear cluster 29 mounted on a layshaft 30 parallel to the input shaft 25 and main shaft 27 and supported at its opposite ends in bearings 31 in the casing 23.

The rear end of the layshaft 30 is formed with an internally splined, cupped extension 32 connected to the planet carrier 33 of the centre differential gear 20, the planet carrier 33 constituting the input element of the centre differential gear. The output to the rear wheels is taken from the annulus 34 which is splined at 35 to a gear wheel 36 mounted on bearings on the cupped extension 32 of the layshaft 30. The gear wheel 36 meshes with an idler gear 37 mounted on bearings on the main shaft 27 and meshing in turn with a gear wheel 38 connected to the stub shaft 22 through a one-way clutch 39.

In one-way clutch 39, the outer member 39a can be overrun by the inner member 39b which is splined to the stub shaft 22. Due to the overrunning action of the one-way clutch 39 a reduction in engine speed cannot apply braking effect to the rear road wheels through the transmission. That is to say that when the road wheels tend to overrun the engine, torque will not be transmitted from the rear wheels through the transmission to the engine. To override this effect, the one-way clutch 39 may be locked. For this purpose, an annular ring 39c is splined to and can slide axially of the outer member 39a of the clutch assembly 39. A toothed locking wheel 39d is splined to the stub shaft 22 and may be connected with the outer member of the one-way clutch 39 by sliding the ring 39c to the rear so as to engage the locking wheel 39d. This connects the outer member 39a of the one-way clutch 39 to the stub shaft 22, thus effectively locking the one-way clutch 39. Locking movement of the ring 39c is effected by a follower 39e slidably engaged in an annular groove 39f in the ring 39c and carried by a push rod 39g operable by a two-arm lever 39h pivoted intermediate its ends to a bracket 40 on the casing 23. In both the locked and unlocked condition of the one-way clutch 39, rotation of the gear wheel 38 and outer member 39a is permitted by virtue of the sliding connection between the follower 39d and the ring 39c.

The stub shaft 22 carries a bevel pinion 41 which meshes with a crown wheel 42 constituting the input to a bevel differential gear assembly 43 (see FIG. 4) which constitutes the rear inter-wheel differential gear and provides output drive to the rear half shafts 14 through intermediate shafts 44 and 45.

An output from the centre differential gear 20 to the front wheels is taken from the sun wheel 46 through a first transmission shaft in the form of a tubular shaft 52 mounted at its front and rear ends in bearings 53 and 54 respectively in the casing 23. At its rear end the tubular shaft 52 is connected by internal splines 55 to the rear end of an output shaft 21 which is sleeved over part of its length by the tubular shaft 52 and is supported at its forward end in bearings 56. A universal joint 57 connects the output shaft 21 to the propeller shaft 15 and thus to the front wheels 10. The sun wheel 46 is splined to a second transmission shaft in the form of a tubular intermediate shaft 47 coaxial with the lay shaft 30 and supported at its forward end in bearings 48 in the lay shaft 30 and at its rear end in bearings 49 carried in the casing 23, the drive being transmitted by first drive transfer means in the form of a gear wheel 50 splined in the rear end of the intermediate shaft 47 and meshing with a further gear wheel 51 splined to the tubular shaft 52.

Thus, in operation of the transmission so far described, drive from the engine 12 is transmitted through the main clutch 18, and input shaft 25 to the change speed gear assembly 19 and the output from the change speed gear assembly is transmitted by the layshaft 30 to the planet carrier 33 of the centre differential gear 20. This gear provides one output from the annulus 34 through the gears 36, 37, 38 and one-way clutch 39 to the stub shaft 22 and hence through the differential bevel gear assembly 43 to the rear wheels 11, and a second output from the sunwheel 46 through the gears 50 and 51, tubular shaft 52, output shaft 21 and hence through the propeller shaft 15 and differential gear 16 to the front wheels 10.

The centre differential gear 20 is a controlled differential gear; that is to say, there is provided control means for locking the gear to prevent differential action when the speed of the sunwheel 46 varies relative to the speed of the annulus 34 by more than a predetermined amount. This would occur where the front wheels tended to spin and the rear wheels to lock, or vice-versa, and the locking means for the centre differential gear is arranged to take account of both these occurrences.

The one-way overrunning means includes control clutch devices 58 and 59 supported by and co-axial with shafts 52 and 47 respectively. The clutch device 59 includes an annular carrier 59A splined to, but axially free on, the shaft 47, and provided with three radially disposed support elements or wedging plungers 59B and three axially disposed thrust plungers 59C (FIGS. 3 and 5). The wedging plungers 59B slide in radial slots formed in the carrier 59A and are urged radially outwards by springs 59D. The thrust plungers 59C slide in axial bores in the carrier 59A and are urged out of said bores by suitable springs (not shown). The carrier 59A is surrounded by a cup-shaped body member 59E having a collar 59F formed integrally therewith, and rotatably supported on the shaft 47. The member 59E has a cam surface 59G in registration with the wedging plungers 59B in such a manner as to cause radial movement of the wedging plungers during rotation of the carrier 59A relative to the member 59E.

The member 59E is permitted to rotate in one direction only by a one-way clutch 60 which engages the collar 59F. The overrunning member of the overrunning clutch device 59 is in the form of an annular thrust member 59H splined to, but axially free on, the shaft 47, having a conical face 59J which contacts the heads of the thrust plungers 59C. A rim 59K is provided for sliding contact with wedge faces 59L of the wedging plungers 59B, whereby said wedging plungers in their radially outer position provide a support for the thrust member 59H, said support being removed when the wedging plungers 59B adopt their retracted or radial inner positions.

The thrust member 59H is formed with an extension collar 59P, and an annular presser member 59M carrying inner friction plates 59N surrounds the collar 59P. Elements 59Q located between the thrust member 59H and the presser member 59M cooperate therewith to allow the thrust member 59H to rotationally overrun the presser member 59M in one direction only and to cause said members 59H and 59M to be thrust apart when the direction of overrun is reversed. The underrunning member of the clutch device 59 is in the form of an annular extension 59R of a gear wheel 68 which carries outer friction plates 59S and provides an abutment for the inner friction plates 59N which are interleaved with the outer friction plates 59S, all of said friction plates being axially slidable with respect to their carriers. The gear wheel 68 is splined to a tubular extension 62 of a toothed flange 63 which meshes with the annulus 34. Thus in the overrunning clutch device 59, the inner friction plates 59N are associated with the drive to the front wheels through the presser member 59M and thrust member 59H, and the outer friction plates 59S are connected to the drive to the rear wheels through the gear wheel 68, toothed flange 63 and annulus 34.

The construction of the overrunning clutch device 58 is similar to that of the overrunning clutch device 59 and corresponding parts in the drawings are marked with the appropriate suffix letter preceded by the numeral 58. It should be noted however that the clutch device 59 is shown with the wedging plungers 59B in their radial outer positions whereas the clutch device 58 is shown with the wedging plungers 58B in their radially retracted position. Also, the collar 58F engages a one-way clutch 65, the annular extension 58R is an extension of a gear wheel 67 which meshes with the gear wheel 68, and the members corresponding to those engaging shaft 47 in clutch assembly 59 engage shaft 52 in clutch assembly 58. The gears 67 and 68 constitute a drive transfer between the overrunning member of clutch device 58 and the underrunning member of clutch device 59.

During normal forward drive, all the road wheels of the vehicle must rotate at the same speed and when this condition pertains, the sunwheel 46 of the centre differential gear 20 rotates slightly faster than the annulus 34. This is achieved by suitable selection of the ratios of the front and rear inter-wheel differential gears 16 and 43 and the ratio of the transfer gears 50 and 51. Thus during normal forward drive, in the overrunning clutch device 59 the carrier 59A and thrust member 59H rotate with the shaft 47 and slightly faster than the gear wheel 68. The member 59E is permitted to rotate by the one-way clutch 60, which rotation allows the spring-urged wedging plungers 59B to engage the depressions of cam surface 59G and adopt their radially outer positions to provide a support for the thrust member 59H which is urged axially along shaft 47 by the thrust plungers 59C to lightly press on the presser member 59M which, in turn, lightly presses the assembly of friction plates 59S and 59N against the annular extension 59R of the gear wheel 68. The annular member 59M is thus caused to rotate with the gear 68 due to the drag effect between the interleaved friction plates 59S and 59N and the thrust member 59H is permitted to overrun the presser member 59M by the elements 59Q.

Under conditions when the front wheels tend to lock and/or the rear wheels tend to spin, the direction of rotational overrun between the thrust member 59H and the presser member 59M is reversed, resulting in the elements 59Q causing these members to be thrust apart whereby the friction plates 59S and 59N are compacted. This prevents further separation of the members 59H and 59M which thus lock together and prevent relative rotation between the gear wheel 68 and thrust member 59H, that is between the annulus 34 and the sunwheel 46. Thus the centre differential gear 20 is effectively locked. Differential action in the centre differential gear 20 during normal cornering occurs freely within the limits defined by the "creeping" overrun bias between the sunwheel 46 and the annulus 34 and is limited in one direction by the reaction between the friction plates 59S and 59N.

The operation of the overrunning clutch device 58 is similar to that of the clutch device 59, but controls any tendency for the rear wheels to lock and/or the front wheels to spin. In the clutch device 58, the friction plates 58N are associated with the drive to the front wheels through the presser member 58M and thrust member 58H, and the friction plates 58S are connected to the drive to the rear wheels through the gears 67 and 68, gear 67 being supported by, but free to rotate on, shaft 52. The ratio of gears 67 and 68 is selected to cause the gear 67 to rotate slightly faster than the shaft 52 whereby the presser member 58M overruns the thrust member 58H during normal forward drive. As the clutch assembly 58 rotates in the opposite direction to the clutch assembly 59, the relative directions of overrun of the members 58H, 58M and 59H, 59M are the same in both clutch assemblies. The one way clutch 65 allows the member 58E to rotate during forward drive.

Under conditions when the rear wheels tend to lock and/or the front wheels tend to spin, the direction of rotational overrun between thrust member 58H and presser member 58M is reversed resulting in elements 58Q causing these members to be thrust apart whereby the friction plates 58S and 58N are compacted against the extension 58R of the gear 67. Thus, as with the clutch device 59, the centre differential gear 20 is locked. Differential action in the centre differential gear 20 occurs freely during normal driving as previously stated and is limited by the clutch device 58 in the opposite direction from that in which it is limited by the clutch device 59.

It should be noted that when the direction of rotational overrun reverses in one clutch device, the rotational overrun in the other clutch device merely increases and does not, therefore, cause that clutch device to lock.

During reverse driving it is necessary to disable the overrunning clutch devices. This is achieved by the one-way clutches 60 and 65 respectively preventing reverse rotation of the members 59E and 58E so that the cam surfaces 59G and 58G are held stationary while the carriers 59A and 58A rotate. The wedging plungers 59B and 58B are therefore depressed and so withdraw their support from the thrust members 59H and 58H respectively. Under these conditions, the overrunning clutch devices cannot lock. The thrust members 59H and 58H are displaced axially by the elements 59Q and 58Q against the light pressure of the thrust plungers 59C and 58C and the control faces 59J and 58J hold the wedging plungers in their retracted position. The friction plates in each overrunning clutch device are thus under light pressure only and slip takes place during reverse driving to accommodate the speed difference between their respective carriers.

By virtue of the above described embodiment, an extremely compact transmission unit is provided including a change speed gear assembly, a centre differential gear and outputs to front and rear wheels, control means is also provided for counter-acting spinning of the front or rear wheels and which will permit reverse driving. The entire transmission unit surrounds the rear axle of the vehicle thus geatly increasing the space available for the driver and passenger.

Modifications may be made. For example while a high performance four wheel drive racing vehicle has been described, the invention is also applicable to any four-wheel drive motor vehicle; the centre differential gear could be positioned at the front axle, and the whole arrangement would be reversed; the front and rear differential gears may be controlled differential gears.

We claim:

1. A four wheel drive motor vehicle transmission system having front and rear pairs of road wheels, first and second drive shafts and front and rear differential gears drivingly connecting the drive shafts respectively to the pairs of wheels, a prime mover, and transmission means providing a driving connection between the prime mover and the first and second drive shafts with freedom for differential action one relative to the other, said transmission means including a three-element planetary centre differential gear of which the three elements are an input element and two output elements, a driving connection between the input element of the centre differential gear and the prime mover, a first transmission shaft offset with respect to the axis of rotation of the said input element, a second transmission shaft disposed coaxially with the input element and drivingly connected to one of the output elements of the centre differential gear, first drive transfer means providing a drive between the second transmission shaft and the first transmission shaft and including first and second drive wheels drivingly connected to and coaxial with the second and first transmission shafts respectively, the other of said output elements being in driving connection with one of the drive shafts, said first transmission shaft being in driving connection with the other drive shaft, the ratios of the front and rear differential gears and the ratio of the first and second drive wheels being such that during normal forward drive, when the road wheels are rotating without slip, there is rotational overrun of one output element relative to the other output element, a first overrunning clutch device for locking the centre differential gear when the direction of said rotational overrun tends to reverse, said first clutch device having a first underrunning member and a first overrunning member which members are disposed coaxially with the second transmission shaft and are drivingly connected one to said one output element and the other to one of the other elements of the centre differential gear, second drive transfer means including third and fourth drive wheels coaxial with the second and first transmission shafts respectively, the third drive wheel being drivingly connected to said one of the other elements of the centre differential gear, and a second overrunning clutch device for locking the centre differential gear when the magnitude of said rotational overrun tends to exceed a predetermined value, said second clutch device having a second underrunning member and a second overrunning member which members are disposed coaxially with the first transmission shaft and are drivingly connected one to the first transmission shaft and the other to the fourth drive wheel, said predetermined value being determined by the ratio of the third and fourth drive wheels, the first underrunning member being in driving connection with the second overrunning member through one of the drive transfer means, the first overrunning member being in driving connection with the second underrunning member through the other drive transfer means.

2. A transmission system according to claim 1, wherein said centre differential gear is a spur-type gear whereof the input element is the planet carrier and the output elements are the sun gear and the annulus.

3. A transmission system according to claim 2, wherein the second transmission shaft is connected to the sun gear of the centre differential gear.

4. A transmission system according to claim 3, wherein said other drive shaft is said first drive shaft.

5. A transmission system according to claim 4 wherein the said one of the other elements of the said differential gear is the annulus.

6. A transmission system according to claim 1, wherein the first and sceond drive wheels are mutually meshing gear wheels.

7. A transmission system according to claim 1, wherein the third and fourth drive wheels are mutually meshing gear wheels.

8. A transmission system according to claim 1, wherein the first and second clutch devices are one-way overrunning clutch devices.

9. A transmission system according to claim 8, wherein at least one of the said overrunning clutch devices has a set of first and second mutually interleaved friction plates associated with the underrunning member and the overrunning member respectively for rotation therewith and free axial movement relative thereto, means defining a first abutment on one of the clutch members and disposed on one side of the friction plates for co-operation with the set during clutching, a presser member disposed on the opposite side of the friction plates from the first abutment and moveable axially of the clutch devise towards the first abutment to a first position in which the first and second friction plates are pressed against the first abutment and into mutually locking engagement, and away from the first abutment to a second position in which the first and second friction plates are permitted to slip and rotate relatively to one another, means defining a second abutment on the other of the clutch members and disposed in an operative position on the side of the presser member remote from the friction plates, and mutually co-operating presser-actuating elements interposed between the presser member and the second abutment for moving the presser member to the said first position by reaction with the presser member and the second abutment when the underrunning member tends to overspeed the overrunning member in one direction of rotation.

10. A transmission system according to claim 9, wherein the said other clutch member is mounted for movement axially of the clutch device away from the presser member to an in-operative position in which the presser actuating elements are unable to react with the presser member and the second abutment and towards the presser member to said operative position, and including means for disabling the overrunning clutch device, said disabling means being disposed adjacent said other clutch member on the side thereof remote from the presser member and including a carrier, and a support element on the carrier and moveable relative thereto to a supporting position in which the support element supports the said other clutch member in the operative position thereof and to a disabling position in which the support element permits movement of the said other clutch member to the in-operative position thereof.

11. A transmission system according to claim 10, wherein the carrier is mounted coaxially with the said other clutch member for rotation therewith, and including means for moving the support element to the disabling position when the said transmission means is driven in reverse, said last mentioned means comprising a body member mounted for rotation about the axis of the clutch device, a one-way clutch connected to the body member for preventing rotation thereof in the same direction of rotation as the said other clutch member only when the said transmission means is driven in reverse, and means defining a cam face on the body member and engaging the support element for reaction therewith to move the latter to the disabling position upon rotation of the carcier relative to the body member.

12. A transmission system according to claim 11, wherein the direction of movement of the support member relative to the carrier is radial with respect to the axis of the clutch device.

13. A transmission system according to claim 1, including change-speed gears interposed in the driving connection between the input element of the centre differential gear and the prime mover, and a transmission casing containing the change-speed gears, the said transmission means, one of the differential gears and its associated drive shaft, the prime mover and the transmission casing being situated adjacent the same end of the vehicle as said last mentioned differential gear, the transmission casing surrounding the axis of rotation of the road wheels connected to said last mentioned differential gear, the other drive shaft comprising a propeller shaft extending longitudinally of the vehicle.

References Cited

UNITED STATES PATENTS

| 2,291,174 | 7/1942 | Stewart | 180—22 |
| 2,603,108 | 7/1952 | Carlson | 180—22 X |
| 3,324,965 | 6/1967 | Koch et al. | 180—22 |

A. HARRY LEVY, *Primary Examiner.*